(12) United States Patent
Kalra et al.

(10) Patent No.: US 11,230,298 B2
(45) Date of Patent: Jan. 25, 2022

(54) SERIAL AIRLOCK ARCHITECTURE

(71) Applicant: Hyperloop Technologies, Inc., Los Angeles, CA (US)

(72) Inventors: Chiranjeev Kalra, Niskayuna, NY (US); Josh Giegel, Hawthorne, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 165 days.

(21) Appl. No.: 16/407,797

(22) Filed: May 9, 2019

(65) Prior Publication Data

US 2019/0344806 A1     Nov. 14, 2019

Related U.S. Application Data (60) Provisional application No. 62/669,682, filed on May 10, 2018.

(51) Int. Cl.
| | | |
|---|---|---|
| *B61B 13/10* | (2006.01) | |
| *B61B 1/00* | (2006.01) | |
| *B61B 13/08* | (2006.01) | |
| *F16K 7/10* | (2006.01) | |
| *F16K 3/03* | (2006.01) | |

(52) U.S. Cl.
CPC ............... *B61B 1/00* (2013.01); *B61B 13/08* (2013.01); *F16K 3/03* (2013.01); *F16K 7/10* (2013.01)

(58) Field of Classification Search
CPC ..... F16K 3/03; F16K 7/10; F16K 7/18; B61B 1/00; B61B 13/08; B61B 13/10; B61B 13/122; B61B 13/12; B60L 13/04; B65G 13/04; B65G 51/04; F24F 13/10
See application file for complete search history.

(56) References Cited

U.S. PATENT DOCUMENTS

| | | | |
|---|---|---|---|
| 3,954,064 A | 5/1976 | Minovitch | |
| 4,075,948 A | 2/1978 | Minovitch | |
| 4,148,260 A | 4/1979 | Minovitch | |
| 5,950,543 A * | 9/1999 | Oster | B61B 13/10 104/138.1 |
| 8,915,192 B2 | 12/2014 | Zhou | |
| 9,290,187 B2 * | 3/2016 | Dalrymple | B61B 13/122 |
| 9,599,235 B2 | 3/2017 | Cothern et al. | |
| 9,718,630 B2 | 8/2017 | Bambrogan et al. | |
| 10,088,061 B2 | 10/2018 | Cothern et al. | |
| 10,316,562 B2 | 6/2019 | Lam | |
| 2010/0150544 A1 * | 6/2010 | Koop | G03B 9/08 396/453 |
| 2014/0261054 A1 * | 9/2014 | Oster | B61B 13/08 104/130.02 |

(Continued)

OTHER PUBLICATIONS

CNN article—Elon Musk (Year: 2013).*

*Primary Examiner* — Mark T Le
(74) *Attorney, Agent, or Firm* — Greenblum & Bernstein, P.L.C.

(57) ABSTRACT

An airlock system that includes a plurality of adjacent chambers successively arranged along a guide path. Predetermined pressures are produced in each chamber so that the predetermined pressure in each chamber is at a pressure different from the predetermined pressure produced in an adjacent chamber. Gate valves are positioned to separate adjacent chambers in order to maintain a pressure differential between the adjacent chambers.

19 Claims, 5 Drawing Sheets

(56) References Cited

U.S. PATENT DOCUMENTS

2016/0229297 A1\* 8/2016 Finodeyev .............. B60L 50/90
2016/0229418 A1   8/2016 Bambrogan et al.
2016/0230899 A1\* 8/2016 Cothern ................... F16K 3/03
2017/0146136 A1   5/2017 Cothern et al.
2018/0051735 A1   2/2018 Stenyakin
2019/0193882 A1   6/2019 Grip et al.

\* cited by examiner

SERIAL AIRLOCK ARCHITECTURE

CROSS-REFERENCE TO RELATED APPLICATION

This application claims the benefit of U.S. Provisional Application No. 62/669,682 filed May 10, 2018, the disclosure of which is expressly incorporated by reference herein in its entirety.

BACKGROUND

Airlocks are integral to maintaining a controlled pressure in a system, particularly when the system involves the passage of beings and/or objects between two or more different environments.

Conventional airlocks, however, can create a bottleneck in the system at the location of the airlock, as the beings and/or objects passing through may be required to stop moving as respective locks close and open. This bottleneck is not ideal, as the bottleneck typically creates a lower throughput in the system.

Thus, there is a need for an improved airlock for a high-speed transportation environment.

SUMMARY

The novel features which are characteristic of the disclosure, both as to structure and method of operation thereof, together with further objects and advantages thereof, will be understood from the following description, considered in connection with the accompanying drawings, in which the preferred embodiment of the disclosure is illustrated by way of example. It is to be expressly understood, however, that the drawings are for the purpose of illustration and description only, and they are not intended as a definition of the limits of the disclosure.

The present disclosure is related to an airlock system. With embodiments of the present disclosure, the airlock system may be capable of allowing passage through a system with two or more different environments or regions while allowing the two or more different environments to remain substantially constant.

In an exemplary embodiment, the airlock system may include a passage and one or more gate valves. The passage may include more than one environment. The passage may allow for movement of one or more objects and/or beings. The gate valves may be arranged successively within the passage. A gate portion of the gate valves may be substantially the same size as a width of the passage, such that when the gate valves close, the passage may become blocked. The gate valves may remain closed until prompted to open. When two of the gate valves are closed, a substantially sealed chamber may be created there between, i.e., in the passage between the two closed gate valves. The chamber in between successive gate valves may allow for a transition to a different environment. Therefore, a passage having two or more gate values may include, for example, two or more different environments between sequential or successive gate valves.

In an exemplary embodiment, a passage may include a plurality of chambers. Chambers at opposing ends of the passage may have significantly different environments, such as, but not limited to, different pressures and/or temperatures. Successively arranged chambers interposed between the opposing end chambers may progressively step down/up the differences between the end chamber environments or include an environment that is between environments in adjacent chambers. Therefore, the chambers nearest the end chamber of a first environment may have an environment significantly similar to the first environment, while the environments of each successive chamber toward the second end may become increasingly more similar to a second environment. The successive plurality of gates defining the plurality of chambers provides a stepwise blending or transition from a first environment at a first region of the passage to a second environment at a second region of the passage.

In an exemplary embodiment, as the objects and/or beings approach a first gate valve from the first portion, the gate of the first gate valve may open, allowing the objects and/or beings to pass through the first gate valve into the chamber between the first gate valve and a second gate valve. Once the objects and/or beings are inside the chamber, the first gate valve may close. When the objects and/or beings approach the second gate valve, a gate of the second gate valve may open, allowing the objects and/or beings to pass through the second gate valve and into the second portion. This may continue until the objects and/or beings have reached the second portion. The gates of the gate valves may open and close with sufficient speed such that the objects and/or beings may move continuously through the passage. As such, the objects and/or beings may not come to rest in the chambers.

Embodiments are directed to an airlock system that includes a plurality of adjacent chambers successively arranged along a guide path, in which predetermined pressures are produced in each chamber so that the predetermined pressure in each chamber is at a pressure different from the predetermined pressure produced in an adjacent chamber. Gate valves are positioned to separate adjacent chambers in order to maintain a pressure differential between the adjacent chambers.

According to embodiments, a plurality of pumps can be arranged to produce the predetermined pressures in each of the plurality of adjacent chambers.

In accordance with embodiments, the gate valves may be configured to transition from a normally closed state to an open state, and to transition from the open state to the normally closed state.

According to other embodiments, the gate valve can include a shutter mechanism having a plurality of overlapping blades. Alternatively, or additionally, the gate valve can include an airbag mechanism that includes a bag and a blower that inflates the bag when the gate valve is to be closed.

In accordance with embodiments, the gate valves and the chambers can be stationary along the guide path.

In other embodiments, the gate valves and the chambers can be movable along the guide path. Further, a position of the gate valves along the guide path can be variable, which varies the lengths of the chambers adjacent the position varying gate valves.

According to other embodiments, the adjacent chambers may be arranged to define a passage to couple a first region, which is maintained at a first pressure, to a second region, which is maintained at a second pressure, and the pressure in the first region is different from the pressure in the second region. The predetermined pressures in the adjacent chambers can be selected to one of progressively step up or progressively step down the pressures between the first region and the second region. Further, a guide way can be arranged to extend along the guide path from the first region to the second region. The guide way may be configured to guide a moving object from the first region to the second region and from the second region to the first region. As the moving object moves along the guide way and approaches a gate valve, the gate valve can be configured to transition from a normally closed state to an open state, and after the object passes through the open state gate valve, the gate valve can be configured to transition from the open state to the normally closed state. The first pressure may be maintained at an ambient pressure and the second pressure may be maintained at low pressure at which the moving object travels at high speed. The moving object can travel at the high speed of greater than 150 m/sec, within the first region maintained at the low pressure of about 100 Pa. The moving object can include a pod of a magnetic levitation transport system. Each of the plurality of adjacent chambers can be closed chambers defining, within the closed chambers, portions of the guide path, and the pod can have an outer periphery that substantially matches an inner periphery of the closed chambers.

Embodiments are directed to a method for isolating a first region maintained at a first environment and a second region maintained at a second environment, wherein the first and second environments are different from each other. The method includes forming an airlock between the first region and the second region, in which the airlock comprises a plurality of chambers, which are separated by gate valves, successively arranged along a guide path and maintaining each of the plurality of chambers at an environment different from an environment in an adjacent chamber.

In accordance with still yet other embodiments, the first region can be maintained at a pressure higher than that of the second region, and the plurality of chambers may be pressurized at predetermined pressures that progressively decrease from a first chamber adjacent the first region to a last chamber adjacent the second region. Further, the method an include sequentially opening the gate valves from the first chamber to the last chamber to allow an object to move through the airlock without stopping.

DESCRIPTION OF THE DRAWINGS

These and other features of this disclosure will be best understood by reference to the following detailed description of a preferred embodiment of the disclosure, taken in conjunction with the accompanying drawings, in which.

DETAILED DESCRIPTION OF THE EMBODIMENTS OF THE DISCLOSURE

The following detailed description illustrates by way of example, not by way of limitation, the principles of the disclosure. This description will clearly enable one skilled in the art to make and use the disclosure, and describes several embodiments, adaptations, variations, alternatives and uses of the disclosure, including what is presently believed to be the best mode of carrying out the disclosure. It should be understood that the drawings are diagrammatic and schematic representations of exemplary embodiments of the disclosure, and are not limiting of the present disclosure nor are they necessarily drawn to scale.

Embodiments of the present disclosure may be used in a transportation system, for example, as described in commonly-assigned application Ser. No. 15/007,783, titled "Transportation System," and as described in commonly-assigned application Ser. No. 15/007,712, titled "Gate Valves and Airlocks for a Transportation System," the contents of which are hereby expressly incorporated by reference herein in their entirety.

In the following description, the various embodiments of the present disclosure will be described with respect to the enclosed drawings. As required, detailed embodiments of the embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, reference to "a magnetic material" would also mean that mixtures of one or more magnetic materials can be present unless specifically excluded. As used herein, the indefinite article "a" indicates one as well as more than one and does not necessarily limit its referent noun to the singular.

Except where otherwise indicated, all numbers expressing quantities used in the specification and claims are to be understood as being modified in all instances by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e. the range from 95 to 105. Generally, when the terms "about" and "approximately" are used, it can be expected that similar results or effects according to the disclosure can be obtained within a range of ±5% of the indicated value.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B".

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly "perpendicular" refers to deviating less than 5° from mathematically exact perpendicular alignment.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for instance a composition comprising a compound A may include other compounds besides A. However, the term "comprising" also covers the more restrictive meanings of "consisting essentially of" and "consisting of", so that for instance "a composition comprising a compound A" may also (essentially) consist of the compound A.

The various embodiments disclosed herein can be used separately and in various combinations unless specifically stated to the contrary.

Exemplary embodiments described herein may include components for an airlock system. The airlock system may include a passage and one or more gate valves. The gate valve can be successively arranged along the passage to define successive chambers. The passage may arranged between two regions having different environments (e.g., a region of relatively lower pressure environment and a region of relatively higher pressure environment). Moreover, the passage may be configured to allow for movement of one or more objects and/or beings through and/or along the passage. The gate valves may be arranged successively arranged within and along the passage, e.g., in a directions of a length of the passage.

In an exemplary embodiment, a gate portion of the gate valves may be substantially a same size as a width of the passage, such that when the gate valves opens, the person and/or object guided through the passage can pass through the gate valve without obstruction, and, when the gate valve closes, the passage may become blocked. The gate valves may be normally closed so that the gate valves remain closed until prompted to open. When two successively arranged gate valves in the passage are closed, a substantially sealed chamber may be created in the passage between the two closed gate valves.

In an exemplary embodiment, the gate valves may open and close in substantially rapid succession. The gate valves may be sequenced so that when the gate of one gate valve fully closes, the gate of the next gate valve may immediately begin to open. The gates of the gate valves may open and close with sufficient speed such that the objects and/or beings may move continuously through the passage. As such, the objects and/or beings may not be required to come to rest in the chambers. An airbag-style gate valve may have an approximate closing and opening time of 50 milliseconds. A metal sheet-style gate valve may have an approximate closing and opening time of 100 milliseconds. In some embodiments, a maximum allowable closing and opening is approximately 1 second.

In an exemplary embodiment, the substantially sealed chamber formed between successive (closed) gate valves. Moreover, opening a gate valve formed between two successive pressurized chambers, which are maintained at different environments, may allow for a transition between the two a different environment. In an exemplary embodiment, a first portion of the passage may have an environment that is significantly different than a second portion of the passage. In order to move an object from the first region to the second region, while still maintaining the different environments of the first and second regions, a passage with two or more gate valves may be positioned in between the first and second regions. The gate valves may be used in order to maintain the different environments of and between the first and second regions. As the object traveling within the first region approaches a first gate valve, e.g., located between the first region and the passage, a gate of the first gate valve may open, thereby allowing the object to pass through the open first gate valve and into a first chamber defined between the first gate valve and a next, second gate valve. Once the object is inside the first chamber, the first gate valve may close. When the object approaches the second gate valve, a gate of the second gate valve may open, thereby allowing the object to pass through the second gate valve and into the second region.

In an exemplary embodiment, multiple gate valves may be used, with chambers being defined between two successive gate valves. Each chamber may contain a slightly different environment than adjacent chambers preceding and succeeding it. As such, the object may move from a first region with one environment to a second region with a significantly different environment, with the object being introduced to the environment of the second portion gradually, through a step-wise progression of different environments provided in the successive chambers in the passage coupling the first region and the second region.

In an exemplary embodiment, the gate of each of the gate valves may include a shutter mechanism. The shutter mechanism may include one or more blades. When the gate valve is closed, the blades can be arranged to significantly occupy a width, and preferably an entirety of the periphery, of the passage. When necessary for the gate to open, the blades may move or pivot towards a periphery of the gate valve, and away from a middle portion of the gate valve, to create an opening. Preferably, a periphery of the opening corresponds to a periphery of an adjacent chamber.

In an exemplary embodiment, the gate of each of the gate valves may be an airbag mechanism. The airbag mechanism may include a bag and a blower. The blower may inflate the bag, which may in turn close the gate valve. The bag may be of sufficient size such that, when inflated, the bag may significantly occupy a width, and preferably an entirety of the periphery, of the passage.

In an exemplary embodiment, the gate of each of the gate valves may be the object travelling through the passage. The object may be approximately the same size as a width, and preferably an entirety of the periphery, of the passage. In this way, the object may significantly occupy an entirety of an interior cross-section of the passage to thereby close (or substantially close) the passage to separate two adjacent chambers.

In an exemplary embodiment, a plurality of objects may travel through the passage. The plurality of objects may travel at substantially a same speed, such that a substantially constant distance may be maintained between the plurality of objects. A distance between the plurality of objects may create "chambers," e.g., enclosed spaces. As the plurality of objects move through the passage, the "chambers" formed between successive pairs of the plurality of objects likewise move through the passage.

In an exemplary embodiment, the airlock system may include one or more pumps. The one or more pumps can be arranged so that each chamber can be individually pressurized and/or the one or more pumps may be located so that each chamber has at least one pump. When successive gate valves enclosing or defining an individual chamber are closed, the pump may remove a volume of air from a chamber, whereby an environment in the chamber can be maintained and/or a predetermined constant volume can be obtained and/or maintained a both before and after one or more objects and/or beings enter and/or exit the chamber.

Figure 1:
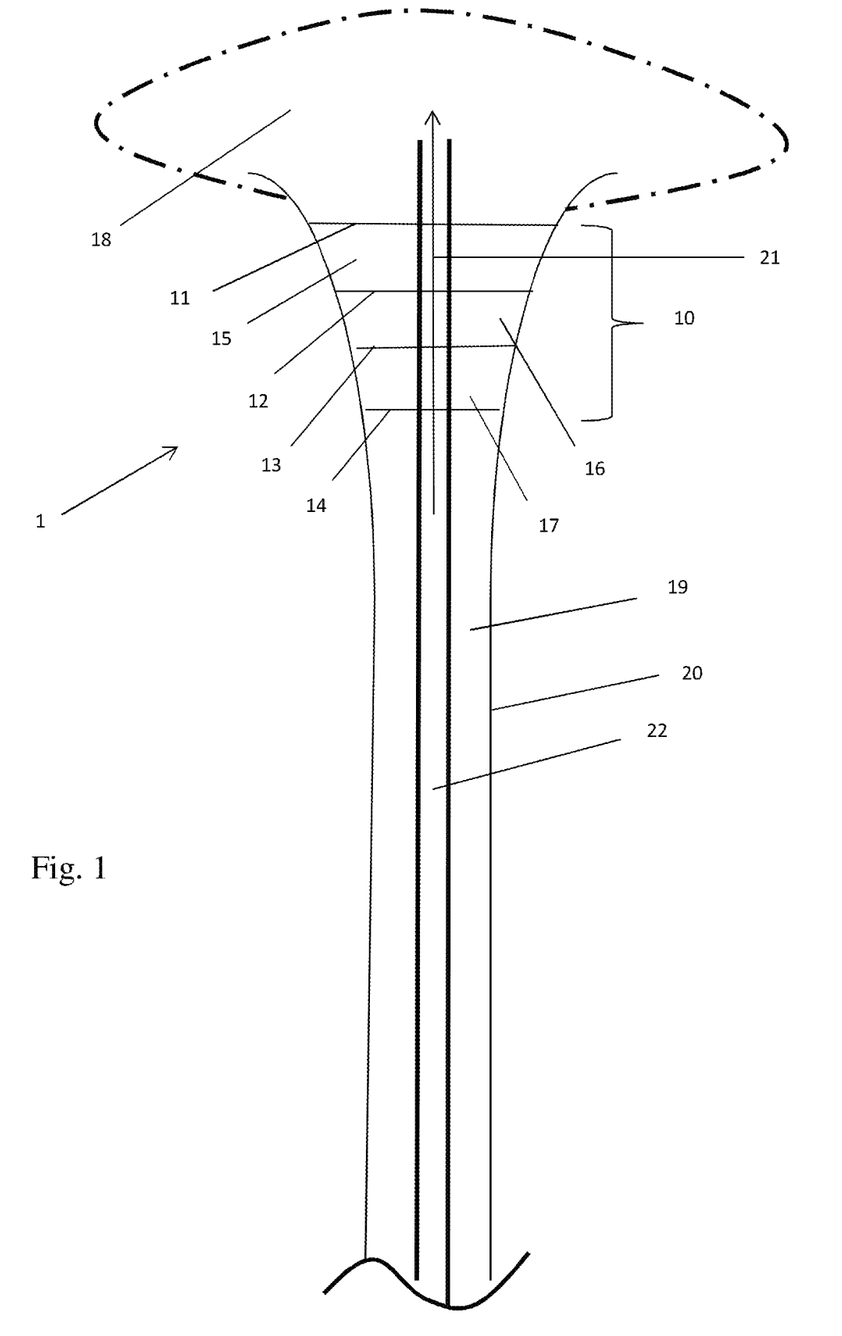
FIG. 1 shows an exemplary airlock system for isolating two differently maintained environments.

FIG. 1 shows an exemplary airlock system in accordance with aspects of the disclosure. As shown in FIG. 1, the airlock system 1 may include a passage 10 and one or more gate valves 11. Passage 10 may allow one or more objects and/or beings to move through it. The one or more gate valves 11 may be arranged in successively arranged along a length of passage 10. A chamber 15, 16, 17 may be created in the portion of the passage in between two consecutively arranged gate valves 11, 12; 12, 13; 13, 14.

Passage 10 can be arranged to couple a first region 18 to a second region 19, in which first region 18 has a significantly different environment than that of second region 19. By way of example, the environment of first region 18 can be an ambient environment, such as ambient pressure and/or ambient temperature, while second region 19 can be a low pressure environment. Of course, it likewise contemplated that the first region 18 can have a lower pressure than that in second region 19. However, as first region 18 and second region 19 are maintained at different environments, passage 10, which couples first region 18 to second region 19, is structured as part of airlock 1, which isolates first region 18 from second region 19, and vice versa.

Accordingly, airlock system 1 is configured with plural chambers 15-17 to progressively or incrementally step up the pressure from second region 19 to first region 18 through passage 10 or to progressively or incrementally step down the pressure from first region 18 to second region 19 through passage 10. However, it is also understood that airlock 1 can be configured to include more than the exemplary four gate valves depicted in FIG. 1 in order to define more than the three chambers depicted in FIG. 1. Thus, as the number of gate valves/chambers in airlock 1 increases, the lower the differential between environments in adjacent chambers needs to be.

Passage 10 can be delimited by a tubular structure 20 extending in a guide path direction 21. Thus, tubular structure 20 is preferably a closed structure. Further, this closed structure can be made of a material to prevent leakage of the maintained environment through the walls of tubular structure 20 or can be provided with a coating on an interior surface of tubular structure 20 made of a material that prevents leakage of the maintained environment through the coated interior surface of tubular structure 20. Within passage 10, a guide way 22, e.g., a track, for guiding an object, e.g., a vehicle or pod, and/or a person, can be arranged. The object and/or beings can be guided over guide way 22, which can be mounted so that the object and/or beings are guided over guide way 22 or which can be mounted so that the object and/or beings are suspended below guide way 22. Further, the object or a portion thereof can include wheels, rollers, magnetic levitation coupling, skids, etc. to facilitate the traversal of the object along guide way 22. While tubular structure 20 is shown as flaring from second region 19 to first region 18, this flaring is not required. Moreover, the flare in tubular structure 20 in FIG. 1 is exaggerated for ease of understanding of embodiments.

In embodiments, the airlock 1 can be part of a transportation system, and preferably a high-speed transportation system. Guide way 22 can be a track for guiding a pod of a magnetic levitation transportation system. In such an embodiment, first region 18 can be, e.g., a pod portal or station for ingress and egress of beings and/or cargo into the pod, which is at ambient pressure, e.g., about 100 kPa, and second region 19 can be a low pressure region of the transportation system, e.g., about 100 Pa, in which high speed travel, e.g., greater than 150 m/sec, preferably greater than 225 m/sec, and most preferably up to 300 m/sec., can be achieved and maintained.

Figure 2:
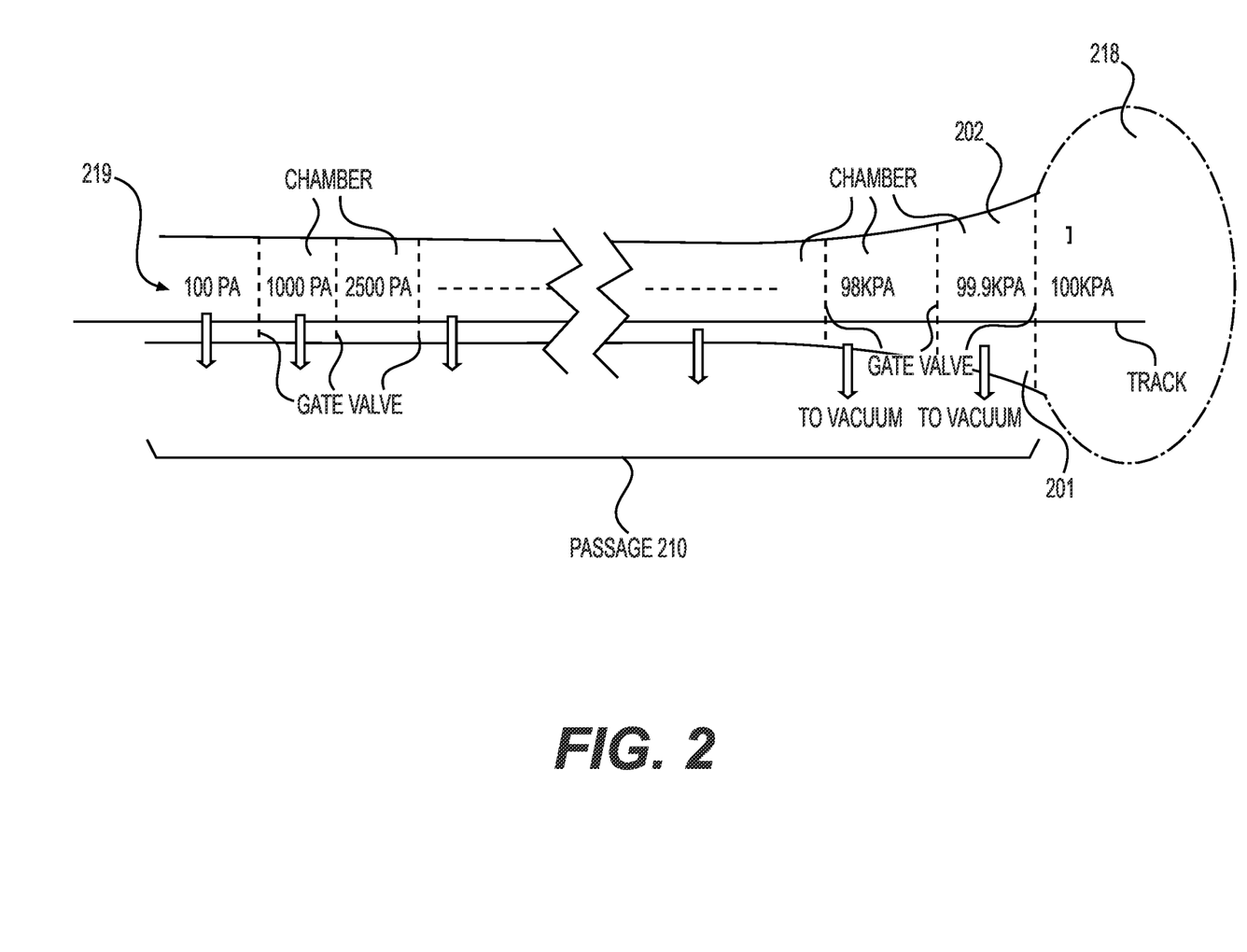
FIG. 2 shows an exemplary airlock system in accordance with aspects of the disclosure.

As shown in greater detail in FIG. 2, for each region 218, 219 to maintain its respective environment while still allowing movement of the objects and/or beings between these regions 218, 219, passage 210 may be segmented by the one or more gate valves 201 in order to create plural chambers 202 within the passage 210. In particular, each pair of adjacent or successive gate valves 201 segmenting passage 210 can create or define an individual chamber 202. Moreover, as in FIG. 2, each chamber 202 may be maintained at a predetermined environment different from a predetermined environment of an adjacent chamber. Further, the environments of each of the plural chambers 202 in FIG. 2 extending between first region 218 and second region 219 can be maintained at predetermined environments that progressively or incrementally step up or step down the environments in order to achieve a smooth transition of environments from first region 218 to second region 219 or vice versa. Thus, each chamber 202 maintains a predetermined environment that is different from an immediately preceding and an immediately succeeding adjacent chambers 202.

Moreover, in the non-limiting exemplary embodiment of FIG. 2, first region 218 can be maintained at, e.g., a pressure of 100 kPa, and second region 219 can be maintained at, e.g., 100 Pa. Further, the chamber 202 that is located immediately adjacent first region 218 can be maintained at 99.9 kPa. When objects and/or beings approach the gate valve 201 separating first region 218 and the chamber 202 immediately adjacent first region 218, this gate valve 201 opens to allow the objects and/or beings through the gate and then closes after the objects and/or being have passed through the gate. Because the pressure differential separated by gate valve 201 is substantially small, e.g., only 0.1 kPa in FIG. 2, the pressure in first region 218 while gate valve 201 is opened will remain substantially similar to the predetermined pressure before gate valve 201 was opened. As the objects and/or being continue to travel toward second region 219, each successive gate valve 201 approached will open to allow the objects and/or beings to pass and close again after the objects and/or beings have passed through. This may continue along the entire length of passage 210 so that the pressure in the chambers through which the objects and/or being travel gradually or incrementally decrease (or increases when traveling in the opposite direction) until the objects and/or being reach second region 219. The number of chambers defined within the passage can vary based upon the pressure differential between the first and second regions and/or the desired differential pressure to be maintained between adjacent chambers. For instance, for a desired differential pressure of 1 kPa, approximately 100 chambers may be utilized within the passage; for a desired differential pressure of 2.5 kPa, approximately 25-40 chambers may be utilized within the passage; for a desired differential pressure of 10 kPa, approximately 10 chambers may be utilized within the passage; for a desired differential pressure of 25 kPa, approximately 4 chambers may be utilized within the passage. Each embodiment has different balancing characteristics, such as cost and system stress. By way of example, the passage can be, e.g., 1-25 km in length. Moreover, the pod can preferably be dimensioned so that, as the pod is guided through the chambers, a gap of 1 cm-10 cm exists between an outer periphery of the moving pod and an interior peripheral surface of the chambers and/or passage.

Figure 3:
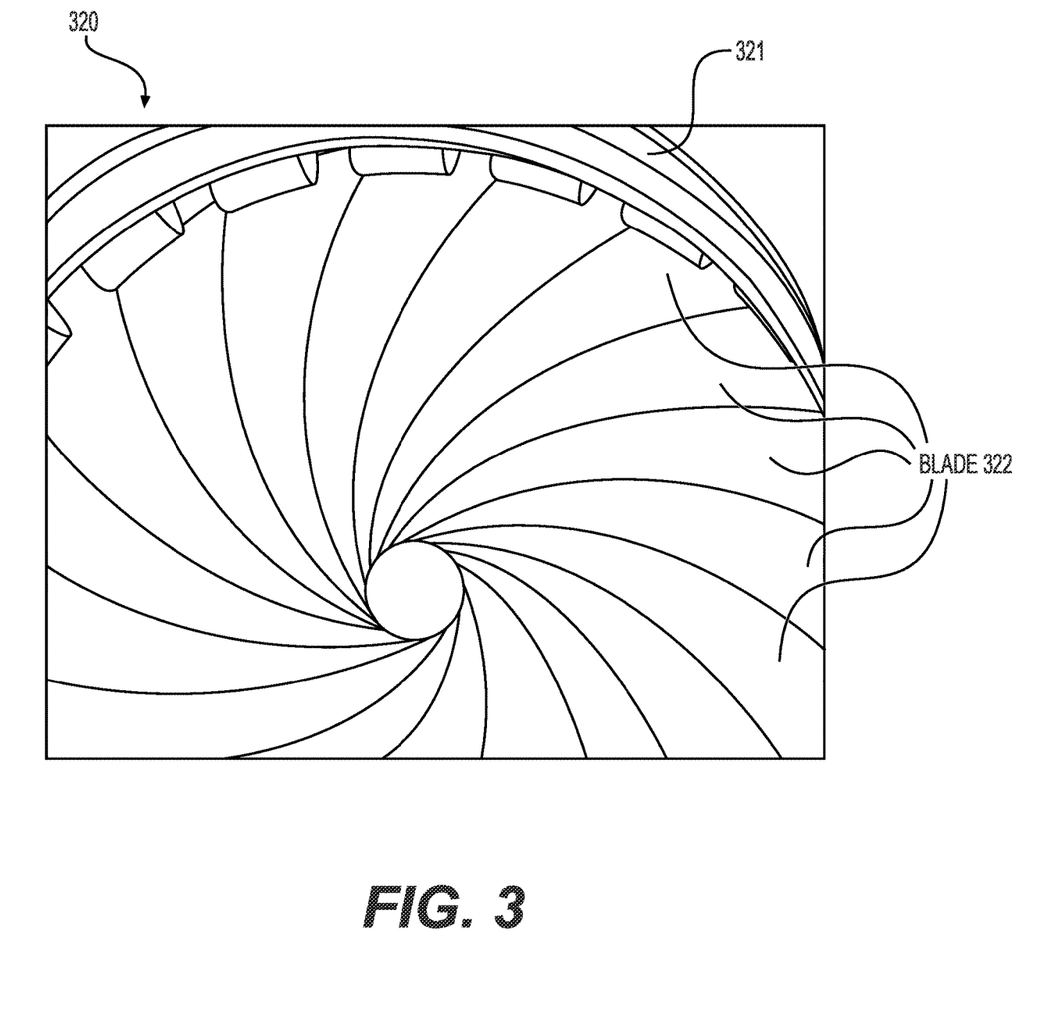
FIG. 3 shows a shutter mechanism in accordance with aspects of the disclosure.

FIG. 3 shows an exemplary embodiment of a gate valve 320, which can include a shutter mechanism formed by, e.g., a gate 321 and at least one blade 322. Moreover, as shown in FIG. 3, the shutter mechanism can include a plurality of blades 322 that overlap to form a substantially circular shape. When the gate valve 320 is closed, blades 322 can be arranged to significantly occupy a width, and preferably an entirety of an interior peripheral surface of passage 10. When necessary for gate valve 320 to open, blades 322 may move or pivot towards an interior peripheral surface of gate 321, and away from a middle portion of gate valve 320, to create an opening. Preferably, the interior peripheral surface of the open gate valve 320 corresponds to an interior peripheral surface of an adjacent chamber and/or the passage. In a preferred embodiment, the shutter mechanism gate valve may have an approximate closing and opening time of about 100 milliseconds.

Within the chambers, sensors can be arranged to monitor the approach of objects and/or people and/or the passage of the objects and/or people through the gate valves. By way of example, the sensors can be proximity sensors or speed sensors. Moreover, the sensors can be pressure sensors to monitor an increase in pressure between a front of the moving object and the gate valve and/or to trigger an opening of the gate valve upon detection of a predetermined triggering pressure.

In other exemplary embodiments, the gate valves can be formed by curtain that can roll, in contrast to the translating blades of the shutter mechanism gate valves. Further, the curtain can be formed from a low temperature plasma sheet. In other embodiments, which can include an airbag mechanism formed by, e.g., a bag and a blower. The blower can be arranged to inflate the bag, which can be dimensioned to close the passage as a gate valve. The bag may be of sufficient size such that, when inflated, the bag may significantly occupy a width, and preferably an entirety of the interior peripheral surface of an adjacent chamber and/or the passage. In a preferred embodiment, this airbag-style gate valve may have an approximate closing and opening time of about 50 milliseconds.

In embodiments, because a small differential pressure exists across the gate valve, the gate valve can be a fast acting shutter or curtain that can roll instead of translate. As the objects and/or people approach the gate valves, the approaching objects and/or people can be sensed or detected to open the gate valve. In embodiments, as the object and/or people move through the passage, air leaks and enters the system, which determines the pressure drop across the valve. Consequently, the first gate valve in the passage can have the smallest differential pressure as this determines the amount of air ingested.

In embodiments, the gate valves can be formed as sacrificial valves made from low structural requirement materials so that, in the event a gate valve fails to open in time to allow the objects and/or people to pass through, the objects and/or people can plow through the sacrificial valve to avoid damaging the objects. In this regard, the sacrificial valves can be made out of air bags, and preferably, a low temperature plasma sheet.

Figure 4:
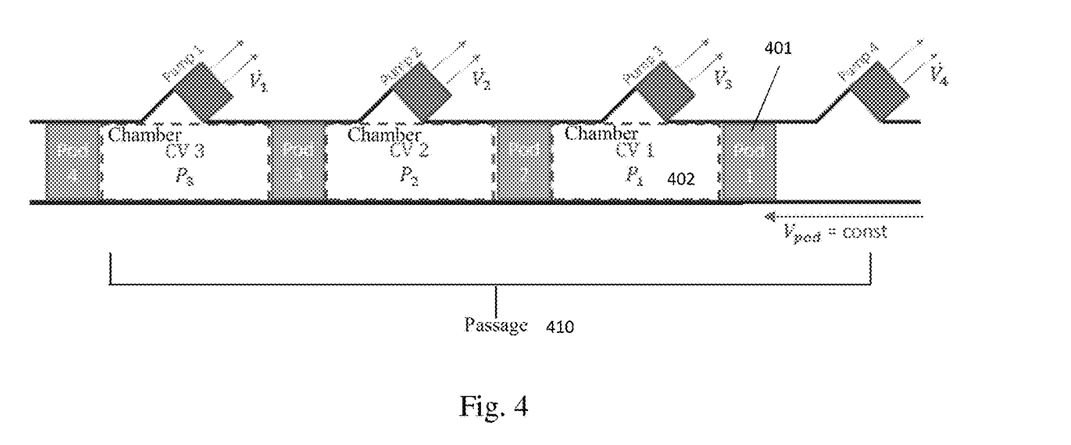
FIG. 4 shows an object or pod acting as a gate of the gate valve in accordance with aspects of the disclosure.

In another exemplary embodiment shown in FIG. 4, the gate of each of the gate valves may be the object travelling through the passage. The moving object may have an outer periphery dimensioned to be approximately the same size as an interior peripheral surface of the chambers and/or passage. By way of example, the object can preferably be dimensioned so that, as the object is guided through the chambers, a gap of 1 cm-10 cm exists between the outer periphery of the moving object and an interior peripheral surface of the chambers and/or passage. In this way, the object may significantly occupy an entirety of an interior cross-section of the passage to thereby close (or substantially close) the passage to separate and define two adjacent chambers.

A plurality of these objects may travel through the passage. The plurality of objects can travel at substantially a same speed, such that a substantially constant distance may be maintained between the plurality of objects. This distance between successively located objects may create "chambers" within enclosed spaces between the moving objects. As the plurality of objects move through the passage, the "chambers" formed between successive pairs of the plurality of objects likewise move through the passage.

FIG. 4 shows one or more pumps coupled to the passage of the airlock system. As shown in FIG. 4, the objects, e.g., a pods, are spaced a substantially same distance from each other and travel at substantially a same speed, thereby forming successively arranged chambers having a substantially same length to each other between successive pairs of pods. The pumps are spaced a distance that corresponds to the lengths of the chambers in the passage so as to maintain a predetermined pressures in the successive chambers. Each pump can remove a volume of air from a respective chamber so that a constant volume is maintained both before and after the objects passes the pump. Thus, as the object is guided through the passage, the pumps can progressively or incrementally step up or step down the pressure in front of the moving object as it moves from the first region to the second region, or vice versa.

System Environment

Aspects of embodiments of the present disclosure (e.g., control systems for the gate valves and pumps) can be implemented by such special purpose hardware-based systems that perform the specified functions or acts, or combinations of special purpose hardware and computer instructions and/or software, as described above. The control systems may be implemented and executed from either a server, in a client server relationship, or they may run on a user workstation with operative information conveyed to the user workstation. In an embodiment, the software elements include firmware, resident software, microcode, etc.

As will be appreciated by one skilled in the art, aspects of the present disclosure may be embodied as a system, a method or a computer program product. Accordingly, aspects of embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure (e.g., control systems) may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet,
a magnetic storage device
a usb key, and/or
a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present invention may be embodied in a field programmable gate array (FPGA).

Figure 5:
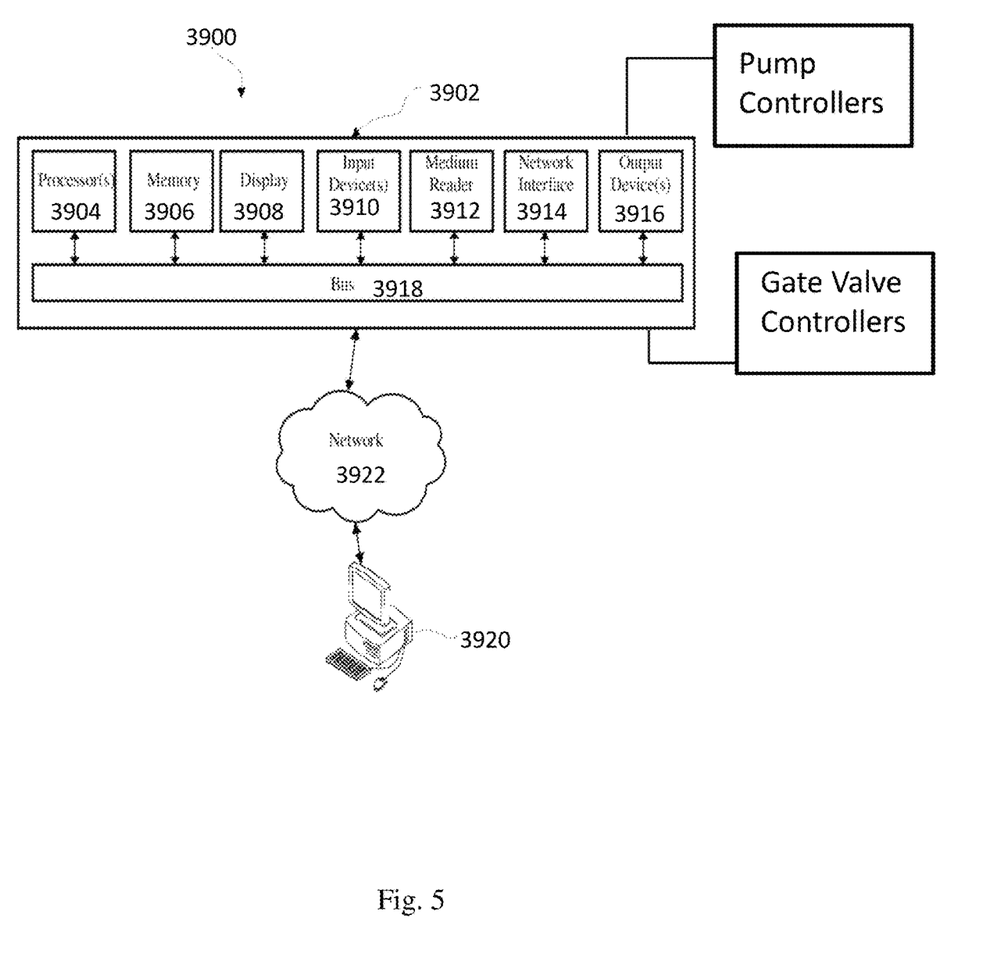
FIG. 5 shows an exemplary environment for practicing aspects of the present disclosure.

FIG. 5 is an exemplary system for use in accordance with the embodiments described herein. The system 3900 is generally shown and may include a computer system 3902, which is generally indicated. The computer system 3902 may operate as a standalone device or may be connected to other systems or peripheral devices. For example, the computer system 3902 may include, or be included within, any one or more computers, servers, systems, communication networks or cloud environment.

The computer system 3902 may operate in the capacity of a server in a network environment, or in the capacity of a client user computer in the network environment. The computer system 3902, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 3902 is illustrated, additional embodiments may include any collection of systems or sub-systems that individually or jointly execute instructions or perform functions.

As illustrated in FIG. 5, the computer system 3902 may include at least one processor 3904, such as, for example, a central processing unit, a graphics processing unit, or both. The computer system 3902 may also include a computer memory 3906. The computer memory 3906 may include a static memory, a dynamic memory, or both. The computer memory 3906 may additionally or alternatively include a hard disk, random access memory, a cache, or any combination thereof. Of course, those skilled in the art appreciate that the computer memory 3906 may comprise any combination of known memories or a single storage.

As shown in FIG. 5, the computer system 3902 may include a computer display 3908, such as a liquid crystal display, an organic light emitting diode, a flat panel display, a solid state display, a cathode ray tube, a plasma display, or any other known display. The computer system 3902 may include at least one computer input device 3910, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 3902 may include multiple input devices 3910. Moreover, those skilled in the art further appreciate that the above-listed, exemplary input devices 3910 are not meant to be exhaustive and that the computer system 3902 may include any additional, or alternative, input devices 3910.

The computer system 3902 may also include a medium reader 3912 and a network interface 3914. Furthermore, the computer system 3902 may include any additional devices, components, parts, peripherals, hardware, software or any combination thereof which are commonly known and understood as being included with or within a computer system, such as, but not limited to, an output device 3916. The output device 3916 may be, but is not limited to, a speaker, an audio out, a video out, a remote control output, or any combination thereof.

Furthermore, the aspects of the disclosure may take the form of a computer program product accessible from a computer-usable or computer-readable medium providing program code for use by or in connection with a computer or any instruction execution system. The software and/or computer program product can be implemented in the environment of FIG. 5. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Accordingly, the present disclosure provides various systems, structures, methods, and apparatuses. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the invention are not intended to be limited to the particulars disclosed; rather the invention extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk, tapes or other storage device to capture carrier wave signals such as a signal communicated over a transmission medium. Accordingly, the disclosure is considered to include any computer-readable medium or other equivalents and successor media, in which data or instructions may be stored.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

While the specification describes particular embodiments of the present disclosure, those of ordinary skill can devise variations of the present disclosure without departing from the inventive concept.

Insofar as the description above and the accompanying drawing disclose any additional subject matter that is not within the scope of the claims below, the embodiments are not dedicated to the public and the right to file one or more applications to claim such additional embodiments is reserved.

An appendix of additional exemplary configurations is also provided herewith.

Insofar as the description above and the accompanying drawing disclose any additional subject matter that is not within the scope of the single claim below, the subject matter are not dedicated to the public and the right to file one or more applications to claim such additional disclosures is reserved.

What is claimed:

1. An airlock system forming a passage between a first region having a first pressure and a second region having a second pressure, which is different from the first pressure, the airlock system comprising:
a plurality of adjacent chambers successively arranged along a guide path, wherein predetermined pressures are produced in each chamber so that the predetermined pressure in each chamber is at a pressure different from the predetermined pressure produced in an adjacent chamber; and
gate valves positioned to separate adjacent chambers in order to maintain a pressure differential between the adjacent chambers,
wherein, via the predetermined pressures in the successively arranged plurality of adjacent chambers, pressure incrementally transitions from at least one of the first pressure to the second pressure or the second pressure to the first pressure.

2. The airlock system according to claim 1, further comprising a plurality of pumps arranged to produce the predetermined pressures in each of the plurality of adjacent chambers.

3. The airlock system according to claim 1, wherein the gate valves are configured to transition from a normally closed state to an open state, and to transition from the open state to the normally closed state.

4. The airlock system according to claim 1, wherein the gate valves comprise a shutter mechanism having a plurality of overlapping blades.

5. The airlock system according to claim 1, wherein the gate valves comprise an airbag mechanism that includes a bag and a blower that inflates the bag when the gate valve is to be closed.

6. The airlock system according to claim 1, wherein the gate valves and the chambers are stationary along the guide path.

7. The airlock system according to claim 1, wherein the gate valves and the chambers are movable along the guide path.

8. The airlock system according to claim 7, wherein a position of the gate valves along the guide path is variable, which varies the lengths of the chambers adjacent the position varying gate valves.

9. The airlock system according to claim 1, wherein the predetermined pressures in the adjacent chambers are selected to at least one of progressively step up or progressively step down the pressures between the first region and the second region.

10. The airlock system according to claim 1, further comprising a guide way extending along the guide path from the first region to the second region.

11. The airlock system according to claim 10, wherein the guide way is configured to guide a moving object from the first region to the second region and from the second region to the first region.

12. The airlock system according to claim 11, wherein, as the moving object moves along the guide way and approaches a gate valve, the gate valve is configured to transition from a normally closed state to an open state, and after the object passes through the open state gate valve, the gate valve is configured to transition from the open state to the normally closed state.

13. The airlock system according to claim 11, wherein the first pressure is maintained at an ambient pressure and the second pressure is maintained at low pressure at which the moving object travels at high speed.

14. The airlock system according to claim 13, wherein the moving object travels at the high speed of greater than 150 m/sec. within the second region maintained at the low pressure of about 100 Pa.

15. The airlock system according to claim 13, wherein the moving object comprises a pod of a magnetic levitation transport system.

16. The airlock system according to claim 15, wherein each of the plurality of adjacent chambers are closed chambers defining, within the closed chambers, portions of the guide path, and
wherein the pod has an outer periphery that substantially matches an inner periphery of the closed chambers.

17. The method for isolating a first region maintained at a first environment and a second region maintained at a second environment, wherein the first and second environments are different from each other, comprising:
forming an airlock between the first region and the second region, wherein the airlock comprises a plurality of chambers, which are separated by gate valves, successively arranged along a guide path; and
maintaining each of the plurality of chambers at an environment different from an environment in an adjacent chamber, wherein the first region is maintained at a pressure higher than that of the second region, and the plurality of chambers are pressurized at predetermined pressures that progressively decrease from a first chamber adjacent the first region to a last chamber adjacent the second region.

18. The method according to claim 17, further comprising sequentially opening the gate valves from the first chamber to the last chamber to allow an object to move through the airlock without stopping.

19. The airlock system according to claim 1, wherein a first of the gate valves is arranged to separate the first region from a first of the adjacent chambers and a last of the gate valves is arranged to separate a last of the adjacent chambers from the second region.

* * * * *